United States Patent [19]

Eher

[11] Patent Number: 4,700,381
[45] Date of Patent: Oct. 13, 1987

[54] CIRCUIT ARRANGEMENT FOR CENTRALLY-CONTROLLED TELECOMMUNICATIONS EXCHANGE SYSTEMS, COMPRISING CENTRAL CONTROL UNITS AND AN ALTERNATE CIRCUIT ARRANGEMENT

[75] Inventor: Manfred Eher, Munich, Fed. Rep. of Germany

[73] Assignee: Siemens Aktiengesellschaft, Berlin and Munich, Fed. Rep. of Germany

[21] Appl. No.: 734,694

[22] Filed: May 16, 1985

[30] Foreign Application Priority Data

May 30, 1984 [DE] Fed. Rep. of Germany ....... 3420281

[51] Int. Cl.[4] .................. H04Q 1/28; H04Q 3/545
[52] U.S. Cl. .................... 379/279; 379/296; 379/323
[58] Field of Search .......... 179/18 EE, 18 ES; 364/133; 340/825.16; 379/279, 284, 296, 323

[56] References Cited

U.S. PATENT DOCUMENTS 4,499,336 2/1985 Krikor et al. .................. 179/18 ES

OTHER PUBLICATIONS

Gerke, "Rechnergesteuerte Vermittlungssysteme", Sec. 6.3.4, 1972, pp. 102–115, Springer Verlag, Berlin/Heidelberg/New York.

Berndt, "SSP112D Mikroelektronisches Zentralsteuerwerk für Digitalkommunikationssysteme", Telcom Report, vol. 4, 1981, pp. 33–37, Siemens (Berlin/Munich).

Primary Examiner—Thomas W. Brown
Attorney, Agent, or Firm—Hill, Van Santen, Steadman & Simpson

[57] ABSTRACT

Two parallel-operated control units each communicate via a respective discrete bus with a respective assigned group of switch devices, and given an alternate circuit based on one control unit simultaneously accepting the tasks for both groups, an alternate circuit bus is provided from the accepting control unit to the other group of switch devices and has bidirectional bus amplifiers connected therein, the one bus amplifier being supplied with voltage together with the accepting control unit and its group and the other bus amplifier being supplied with voltage together with the other control unit and its group. Given a voltage outage of the non-accepting control unit and its assigned group of switch devices, a signal is transmitted to the first-mentioned bus amplifier in order to provide the required disconnection of the alternate circuit bus by way of unequivocal electrical switch states and measures in that bus having supply voltage present.

2 Claims, 1 Drawing Figure

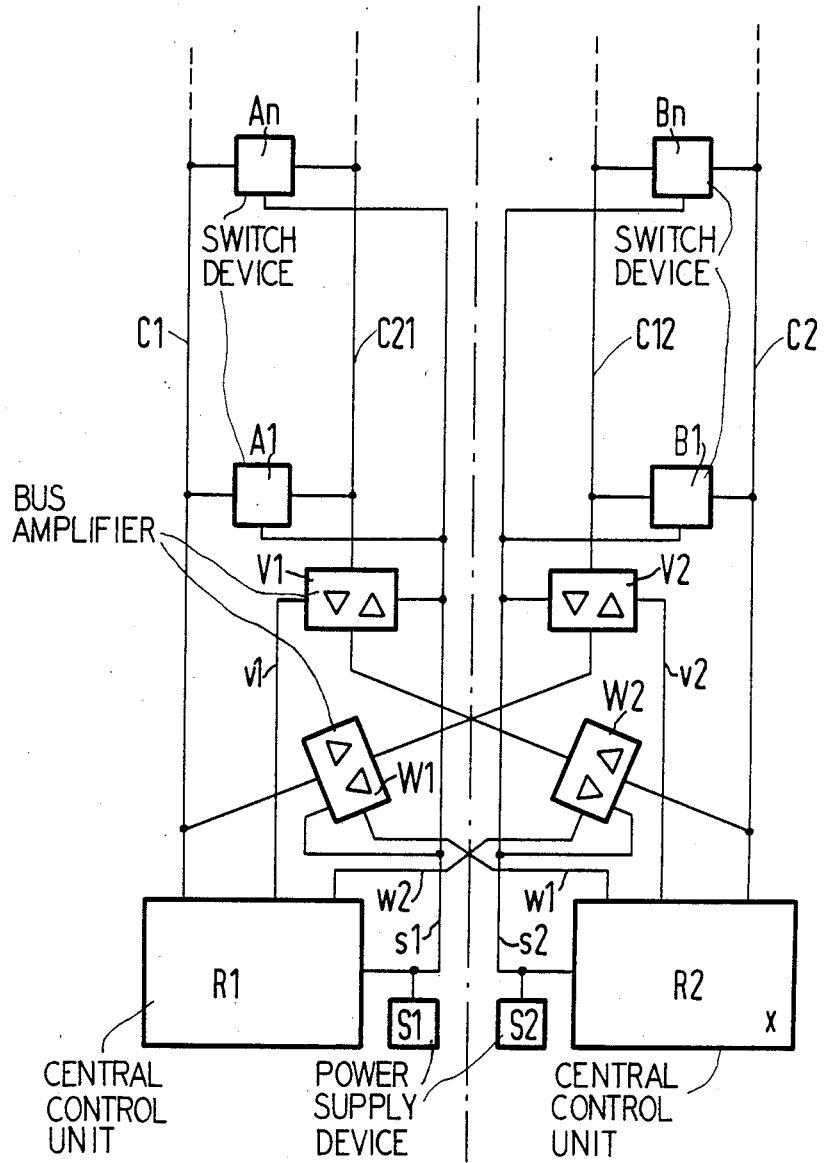

CIRCUIT ARRANGEMENT FOR CENTRALLY-CONTROLLED TELECOMMUNICATIONS EXCHANGE SYSTEMS, COMPRISING CENTRAL CONTROL UNITS AND AN ALTERNATE CIRCUIT ARRANGEMENT

BACKGROUND OF THE INVENTION

1. Field of the Invention

The present invention relates to a circuit arrangement for centrally-controlled telecommunications exchange systems, particularly telephone exchange systems, comprising two parallel-operating central control units and two groups of sub-centralized switch devices, and comprising two bidirectional data bus lines respectively connecting a central control unit to the sub-centralized switch devices of a group. In addition, the arrangement comprises two bidirectional auxiliary data bus lines respectively connecting the sub-centralized switch devices of a respective group to the central control unit assigned to the other group of sub-centralized switch devices, and parallel operation is provided for both central control units in the data exchange with the sub-centralized switch devices of the group assigned thereto via the appertaining bidirectional data bus line. Further, alternate circuit operation is provided, given service interruption of a central control unit or of its assigned data bus line via the respective other central control unit to the sub-centralized sequential logic system of the group of the central control unit affected by the service interruption and bidirectional bus amplifiers looped into the auxiliary data bus lines whereof, respectively, two are connected into an auxiliary data bus line extending from the central control unit to the sub-centralized switch devices of the respective other group and whereof, respectively, a first is connected to the sub-centralized switch devices of the one group and a second is connected to the central control unit of the other group of sub-centralized switch devices.

2. Description of the Prior Art

A circuit arrangement of the type generally set forth above is set forth in the technical book "Rechnergesteuerte Vermittlungssysteme" by Peter R. Gerke, Springer Verlag, Berlin/Heidelberg/New York, 1972, Page 109. An alternate circuit mode in the manner described therein presumes that each of the two separate control units is connectible to every switch device of each of the two groups. For parallel operation to be carried out without error, the two mutually-independent data bus lines respectively assigned to a central control unit and its group of switch devices are required. The two additional, auxiliary data bus lines are required for the alternate circuit mode so that a respective central control unit can enter into communication with the switch devices of the group of switch devices assigned to the other (momentarily fault-affected) central control unit.

Given a parallel operation of central control units in the addressed manner, therefore, a respective central control unit cooperates with the switch devices of the group assigned thereto in a fault-free condition. A central control unit and the switch devices of the group assigned thereto are therefore likewise structurally combined such that they form a unit, in that, for example, they are accommodated in a cabinet rack. The switch devices being addressed can be a matter of dependent, sub-centralized control equipment, of sub-memories, of termination circuits of data transmission links and the like. Depending on the respective three-dimensional extent for which a data bus line extends from a central control unit to the switch devices of its group, a bus amplifier is required. Such bus amplifiers are usually bidirectional because a data transmission must be capable of being executed both from a central control unit to each of the switch devices and in the opposite direction. Primarily, however, such bus amplifiers are required for the alternate circuit mode. As already explained, it is thereby necessary that a central control unit can collaborate with the switch devices of the group assigned to the other central control unit. Naturally, the auxiliary data bus lines provided for this purpose have a greater through-dimensional length than the data bus lines and bus amplifiers and are therefore mainly employed in these auxiliary data bus lines.

The bus amplifiers not only have the job of amplification (and of equalization as well under given conditions) of the signals to be transmitted, but also have the job of coupling and decoupling. In the alternate circuit case, the undisturbed central control unit replacing the fault-affected central control unit must be able to collaborate with the switch devices of the group assigned to the fault-affected central control unit. The appertaining auxiliary data bus line for the alternate circuit mode must therefore be coupled to the undisturbed central control unit, particularly to its data bus line. Given the conclusion of the alternate circuit mode, this auxiliary data bus line must be correspondingly decoupled so that the fault-free parallel operation of both central control units can continue.

In addition to the above, however, there is also the other fault occurrence that a central control unit together with the switch devices of this group are affected by an outage of the operating voltage. Therefore, when a central control unit has a common voltage supply with the switch devices of its group, and this voltage supply fails, then it is not only this central control unit that goes off line but also the switch devices of the group assigned thereto are also down. In case of such a disturbance, therefore, an alternate circuit is superfluous because, in addition to the affected central control unit, the switch devices assigned thereto are also not operational. Such a fault occurrence raises the problem in a circuit arrangement of the type initially set forth of decoupling the auxiliary data bus line which leads to the switch devices of that group that is co-involved in the voltage outage. Whether the appertaining bus amplifier is thereby co-involved in the voltage or not casts in doubt a reliable decoupling in these two possible cases. Such a decoupling is required so that noise influences cannot proceed from the switch devices affected by the voltage outage onto the data bus line which extends from the central control unit not affected by the voltage outage to the switch devices assigned thereto. Such disturbing influences can consist of, for example, an emission of address information or of other data or can consist of an application of disturbing or inhibiting continuous potentials.

SUMMARY OF THE INVENTION

It is therefore the object of the invention, given a circuit arrangement of the type initially set forth, to guarantee an unequivocal decoupling of an auxiliary data bus line in case of an outage of supply voltage of a central control unit together with the voltage supply of the switch devices assigned thereto.

The above object is achieved, according to the present invention, in that the first bus amplifier of the one group or, respectively, of the other group, of sub-centralized switch devices has a common power supply with the central control unit of this group or, respectively, or the other group, and the second bus amplifier has a common power supply with a respective other central control unit; and in that each of the bus amplifiers connected to the respective central control unit is connected via a signal line to the respective other central control unit by way of which signal line, given outage of the voltage supply of a central control unit and the group of sub-centralized switch devices assigned thereto as well as of the bus amplifier connected thereto, a disconnect signal is transmitted to the bus amplifier connected in series thereto and connected to the respective other central control unit, on the basis of which disconnect signal an effective interruption is accomplished in this bus amplifier of the auxiliary data bus line extending via the bus amplifier having a down voltage supply.

BRIEF DESCRIPTION OF THE DRAWING

Other objects, features and advantages of the invention, its organization, construction and operation will be best understood from the following detailed description, taken in conjunction with the accompanying drawing, on which there is a single figure of a circuit arrangement constructed in accordance with the present invention and showing only those components which contribute to an understanding of the invention.

DESCRIPTION OF THE PREFERRED EMBODIMENTS

The present specification departs from an article in the periodical "Telcom Report", Vol. 4, 1981, supplement, particularly Pages 33-37. A further discussion thereof here would be superfluous in that it is assumed that the explanations provided in that article are well known in the art.

Briefly, however, the above-mentioned periodical shows a telephone exchange system having two parallel-operating central control units. Two groups of sub-centralized switch devices are provided, being referred to therein as input/output processors and as message distributors (NB). In this context, the published German application No. 31 06 903, fully incorporated herein by this reference, should also be mentioned. In the periodical, in addition, two bidirectional data bus lines respectively connecting a central control unit to the sub-central switch devices of a group are also shown. A central control unit, one data bus line and one group of sub-central switch devices assigned to the central control unit are also shown above the horizontal, dot-dash line in FIG. 1 on Page 34 of the periodical. The same is true of the illustration in FIG. 1 below the horizontal, dot-dash line.

Further shown in the periodical in FIG. 1 on Page 34 is that the data bus line extending from each of the two central control units branches; one branch of the data bus line represents the auxiliary data bus line. One auxiliary data bus line extends from the sub-central switch devices of respectively one group to the central control unit assigned to the other group of sub-central switch devices. A corresponding illustration may be found on the present drawing. Two central control units R1 and R2 are provided. Groups of sub-central switch devices A1-An and B1-Bn are also provided. One central control unit, for example the central control unit R1, is connected via the data bus line C1 to the sub-central switch devices of the group assigned thereto, for example A1-An. The same holds true for the other central control unit and the other group of sub-central switch devices. The data bus departing each of the two central control units branches to form a data bus line, for example the data bus line C1, and an auxiliary data bus line, for example the data bus line C12. The auxiliary data bus line connects one central control unit, for example the central control unit R1, to the sub-central switch devices, for example the sub-central devices B1-Bn, which are assigned to the other central control unit, here the central control unit R2.

It is provided in the circuit arrangement shown on the drawing, just as the illustration and description provided in the aforementioned periodical, that the two central control units operate in parallel. Each of the central control units is in a data exchange with the sub-central devices of the group assigned thereto via the appertaining bidirectional data bus line. The data exchange on the one side is independent of the data exchange on the other side, and vice-versa.

Given service interruption of a central control unit, for example the central control unit R2, or of its assigned data bus line, for example the data bus line C2, an alternate circuit mode occurs in a known manner via the appertaining auxiliary data bus line, for example the data bus line C12.

Bidirectional bus amplifiers are looped into the auxiliary data bus lines, for example the data bus line C12, these bus amplifiers being referenced "BEU" in FIG. 1 on Page 34 of the aforementioned periodical and being referred to therein as "bus expansion unit". Two respective bus amplifiers, for example a bus amplifier W1 and a bus amplifier V2, are connected to an auxiliary data bus line, for example the auxiliary data bus line C12, which extends from one central control unit, here the central control unit R1, to the sub-central switch devices, for example the sub-central devices B1-Bn, of the respective other group. At first, for example the bus amplifier V2, is connected to the sub-central switch devices, here the sub-central switch devices B1-Bn, of the respective one group and a second bus amplifier W1 is connected to the central control unit R1 of the respective other group of the sub-central switch devices A1-An.

As may be further derived from the drawing, a respective common power supply device, for example the power supply device S1, is assigned to each group of sub-central switch devices, for example the sub-central switch devices A1-An, together with its central control unit, here the central control unit R1. A central control unit is therefore supplied in common with the sub-central switch devices of its group by a separate power supply device.

As may be further derived from the drawing, the first bus amplifier, for example, a bus amplifier V1, of the one group of sub-central switch devices, for example the sub-central switch devices A1-An, has a common power supply with the central control unit of this group. The appertaining power supply line is referenced s1 on the drawing. This power supply device S1 and the power supply line s1 serve for feeding the sub-central switch devices of this group at the same time. The other bus amplifier for the auxiliary data bus line C21 of the one group of sub-central switch devices A1–An is the bus amplifier W2. It is connected in series with the first bus amplifier V1. The second bus amplifier W2 of the auxiliary data bus line C21 has a common power supply with the other central control unit R2 and with the sub-central switch devices B1–Bn of this group. The power supply device S2 is connected by way of the power supply line s2 to the central control unit R2, to the sub-central switch devices B1–Bn and to the second bus amplifier of the auxiliary data bus line C21.

In addition to the known disturbances wherein one of the two central control units fails, but wherein the sub-central switch devices assigned thereto continue to remain operational, and wherein the other central control unit executes the data processing operations and/or control operations for all sub-central switch devices in the alternate circuit mode, i.e. for the group of sub-central switch devices assigned thereto as well to the central control unit malfunctioning at the moment, there is also the disturbance that the power supply device of a central control unit which also supplies the group of sub-central switch devices assigned thereto with operating voltages goes off line. In case of such a malfunction an alternate circuit mode is meaningless or, stated more precisely, is downright impossible because it is not only the appertaining central control unit that is not operational, but rather the group of sub-central switching devices assigned thereto is also not operational due to the lack of a voltage supply. In case of such a malfunction, it must be provided that the data bus line of the undisturbed central control unit is not disturbed via the auxiliary data bus line of that group of sub-central switch devices which is assigned to the central control unit affected at that moment by the voltage outage.

Let it be assumed that the central control unit R2, the sub-central switch devices B1–Bn and the bus amplifiers V2 and W2 are affected by an interruption in the voltage supply by the power supply device S2. In case of such a malfunction, therefore, the bus amplifier V2 also has no voltage supply. As a consequence of a lack of proper supply with operating voltage, the circuits contained therein are incapable of assuming unequivocal switch states. By way of the bus amplifier V2, the auxiliary data bus line C12 can remain entirely or partially in communication with the continuing portion of the auxiliary data bus line which extends via this bus amplifier towards the central control unit R1. For this reason, the bus amplifier W1 which connects this auxiliary data bus line to the data bus line C1 is connected via the signal line w1 to the central control unit R2. A signal is emitted by the central control unit R2, therefore, given outage of the operating voltage and/or whenever it is not supplied with respect to operating voltage, i.e. in the voltage-free quiescent condition (with respect to operating voltage supply). The bus amplifier W1, however, is not affected by this interruption of the supply of operating voltage (outage of the power supply device S2) because it receives its required operating voltage from the power supply device S1. In case of this type of malfunction, therefore, the bus amplifier W1 is operational without restriction. On the basis of the signal received via the signal line w1, by way of which signal the central control unit R2 indicates that it and its sub-central switch devices and the bus amplifiers V2 and W2 are affected by an interruption in operating voltage, the bus amplifier W1 undertakes a disconnection of the auxiliary data bus line between the branch at the data bus line C1 and the bus amplifier V2. The bus amplifier W1 which continues fully operational since it is receiving its full operating voltage therefore accomplishes a complete decoupling of the auxiliary data bus line C12 including the bus amplifier V2 from the data bus line C1 and the central control unit R1. It is thereby prevented that disturbing influences of any kind whatsoever from the area of the central control unit R1 and the sub-central switching devices and bus amplifiers assigned thereto can influence the data bus line C1 and, via the data bus line C1, the central control unit R1 as well as the sub-central switch devices assigned thereto.

Central control unit and sub-central switch devices have been set forth in the present application. The invention, however, is not limited thereto in view of the degree of centralization that the central control units assumed the respectively highest degree of centralization. To the contrary, the central control units can also be sub-central processing equipment and/or control equipment which respectively collaborate via a data bus line with switch devices on a lower level of centralization which are assigned thereto. Further, the invention is not limited to the aforementioned purpose; to the contrary, processing operations of any other type can be provided in addition to the control operations discussed above.

Further, let the function of the bus amplifiers V1 and V2 also be addressed. It is assumed that the central control unit R2 is affected by a service interruption which does not likewise affect the group of sub-central switch devices B1–Bn. In this operating condition, therefore, the central control unit R2 is not operational but the sub-central switch devices B1–Bn assigned thereto remain operational. In this operating condition, the central control unit R2 emits a signal via a signal line v2 to the bus amplifier V2 and therefore signals the fact of a service interruption in the central control unit R2. On the basis of this signal, the bus amplifier V2 undertakes a coupling of the auxiliary data bus line C12 to the bus amplifier W1. By way of the bus amplifier W1, the auxiliary data bus C12 is then connected to the data bus line C1 and, therefore, to the central control unit R1. It can be provided that the bus amplifier W1 produces the connection between the data bus line C1 and the bus amplifier V2 solely on the basis of the operational readiness of the central control unit R1 or, on the other hand, on the basis of an additional signal on the part of the central control unit R2 which the latter emits to the bus amplifier W1 due to its service interruption. This signal, on the basis whereof, therefore, a coupling of the auxiliary data bus line C12 to the data bus line C1 is requested, can likewise be transmitted by way of the signal line w1.

Since the system is constructed in a mirror-symmetric manner, the entire description also applies to those operating instances wherein the central control unit R1 is affected by malfunctions and the central control unit R2 continues to be operational.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for a centrally-controlled telecommunications exchange system, comprising:
    first and second groups of switch devices, each of said groups comprising a plurality of switch devices;
    first and second central control units for parallel operation and each operable to produce control signals, including a first control output for carrying a control signal in response to an operating voltage outage affecting the respective control unit;
    first and second power supply devices, said first power supply device connected to said first central control unit and to said switch devices of said first group of switch devices for supplying operating voltage thereto, and said second power supply device connected to said second central control unit and to said switch devices of said second group of switch devices for supplying operating voltage thereto;
    first and second bidirectional data bus lines respectively connecting said first and second central control units to said switch devices of said first and second groups of switch devices for bidirectional data exchange during operation in a primary operating mode;
    first and second auxiliary bidirectional data bus lines respectively connecting said first bidirectional data bus line to said switch devices of said second group of switch devices, and said second bidirectional data bus line to said switch devices of said first group of switch devices, for operation in an alternate operating mode; and
    first and second bidirectional bus amplifiers connected in series in said first auxiliary bidirectional data bus line,
    third and fourth bidirectional bus amplifiers connected in series in said second auxiliary bidirectional data bus line,
    said first bidirectional bus amplifier connected to said first power supply device for receiving operating voltage and including a control input connected to said control output of said second central control unit for receiving a control signal to cause said first bidirectional bus amplifier to disconnect said first auxiliary bidirectional data bus line in response to a voltage outage of said second power supply device, and
    said third bidirectional bus amplifier connected to said second power supply device for receiving operating voltage and including a control input connected to said control output of said first central control unit for receiving a control signal to disconnect said second auxiliary bidirectional data bus line in response to a voltage outage of said first power supply device.

2. The circuit arrangement of claim 1, wherein:
    said first and second central control units each include a further control output for carrying a control signal indicating a service interruption of the respective central control unit; and
    said second and fourth bidirectional bus amplifiers each include a control input,
    said control input of said second bidirectional bus amplifier connected to said further control output of said second central control unit for receiving a control signal to connect said first auxiliary bidirectional data bus to said first bidirectional data bus via said first bidirectional bus amplifier in response to a service interruption of said second central control unit, and
    said control input of said fourth bidirectional bus amplifier connected to said further control output of said first central control unit for receiving a control signal to connect said second auxiliary bidirectional data bus line to said second bidirectional data bus line via said third bidirectional bus amplifier in response to a service interruption of said first central control unit.

* * * * *